United States Patent [19]
Laroche et al.

[11] Patent Number: 6,147,803
[45] Date of Patent: *Nov. 14, 2000

[54] METHOD OF FORMING A PROTECTIVE LAYER ON A COPPER-FREE REFLECTIVE METAL LAYER

[75] Inventors: Pierre Laroche, Nalinnes; Pierre Boulanger, Couthuin, both of Belgium

[73] Assignee: Glaverbel, Brussels, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/751,972

[22] Filed: Nov. 19, 1996

[30] Foreign Application Priority Data

Nov. 20, 1995 [GB] United Kingdom .................. 9523674

[51] Int. Cl.$^7$ .............................. G02B 1/10; G05D 5/06; C23C 16/00
[52] U.S. Cl. .......................... 359/584; 427/162; 427/165; 427/250; 359/585
[58] Field of Search ............................ 359/584; 427/165, 427/162, 304, 305, 319, 328, 163.4; 428/220, 429; 526/273

[56] References Cited

U.S. PATENT DOCUMENTS 4,745,003  5/1988  Sirkoch et al. .
5,374,451 12/1994  Servais et al. .......................... 427/165
5,728,790  3/1998  Seki et al. ............................... 526/273

FOREIGN PATENT DOCUMENTS

| 9301426 | 3/1995 | Netherlands . |
| 593394 | 6/1946 | United Kingdom . |
| 963118 | 7/1964 | United Kingdom . |
| 1057871 | 2/1967 | United Kingdom . |
| 2227432 | 8/1990 | United Kingdom . |
| 2252568 | 8/1992 | United Kingdom . |
| 2254339 | 10/1992 | United Kingdom . |
| 2289289 | 11/1995 | United Kingdom . |
| 95/18774 | 7/1995 | WIPO . |

*Primary Examiner*—Audrey Chang
*Attorney, Agent, or Firm*—Venable; George H. Spencer; Ashley J. Wells

[57] ABSTRACT

A method of forming a reflective mirror comprised of a copper-free reflective metal layer carried on a transparent substrate, the method including the steps of providing a substrate which is transparent; contacting the substrate with an activating solution comprised of ions of at least one of bismuth (III), chromium (II), gold (III), indium (III), nickel (II), palladium (II), platinum (II), rhodium (III), ruthenium (III), titanium (III), vanadium (III) and zinc (II) to provide an activated substrate; forming a coating comprised of a layer of copper-free reflective metal on a surface of the activated substrate; applying a paint powder which is includes a polymer onto the coating to provide a powder coated assembly; and treating the polymer to form a protective layer of paint on the coating.

47 Claims, No Drawings

METHOD OF FORMING A PROTECTIVE LAYER ON A COPPER-FREE REFLECTIVE METAL LAYER

CROSS-REFERENCE TO RELATED APPLICATION

This application claims the priority of United Kingdom Patent Application n° 95 23 674.1 filed Nov. 20, 1995 and titled "Method of forming a protective layer on a silver mirror", the subject matter of which is incorporated herein by reference.

BACKGROUND OF THE INVENTION

1. Field of the Invention

This invention relates to methods of manufacturing reflective articles comprising a reflective metal coating deposited on a transparent substrate.

A reflective metal coating may be deposited pattern-wise to form a decorative article, but the invention has particular reference to glass substrates bearing a continuous reflective coating. The coating may be applied to a substrate of any form, for example to an artistic object, to achieve some desired decorative effect, but it is envisaged that the invention will find greatest use when the coating is applied to a sheet glass substrate. The coating may be fully reflective, thus forming a mirror-coating.

Reflective metal coatings, e.g. of silver, are apt to be attacked by atmospheric pollution with the result that the silver layer becomes tarnished so that the required optical properties of that layer are lost. It is accordingly known to apply protective layers to such a silver layer, the nature of the protective layer being determined by the required properties of the coated substrate and by cost.

2. Description of the Related Art

Conventionally, silver mirrors are produced as follows. The glass is first of all polished and then sensitised, typically using an aqueous solution of $SnCl_2$. After rinsing, the surface of the glass is usually activated by means of an ammoniacal silver nitrate treatment. The silvering solution is then applied in order to form an opaque coating of silver. This silver coating is then covered with a protective layer of copper and then one or more coats of paint in order to produce the finished mirror.

The purpose of the copper layer is to retard tarnishing of the silver layer, and the copper layer is itself protected from abrasion and corrosion by the layer of paint.

Of the various paint formulations which could be used for protecting a mirror, those which afford the best protection against corrosion of the copper layer contain lead pigments. Unfortunately lead pigments are toxic and their use is being increasingly discouraged for reasons of environmental health.

It has also been proposed to protect the silver coating by treatment with an acidified aqueous solution of Sn (II) salt (see British patent application GB 2252568). According to this proposal, the reflective layer of silver has a surface stratum having a population of tin atoms which is augmented as compared with the population of tin atoms (if any) in an underlying subsurface stratum by at least one tin atom per hundred metal atoms thereby conferring on such metal coating an enhanced resistance to corrosion.

According to another recent proposal, (see British patent application GB 2254339), the reflective layer of silver has been treated with a solution containing ions of at least one of the group consisting of Al (III), Cr (II), V (II or III), Ti (II or III), Fe (II) and In (I or II).

One important application of the protection treatments according to GB 2252568 and GB 2254339 is the formation of silver mirrors which do not include a conventional protective layer of copper. Such copper-free mirrors can be protected with lead-free paints.

Paints are usually applied in liquid form, for example by brushing onto the surface to be protected or by conveying the article through a liquid curtain. It is sometimes difficult to obtain a uniform coating when using this method, resulting either in the use of excess paint or in areas where the paint layer is of insufficient thickness to provide the required protection. Furthermore, liquid paints may contain volatile solvents which are hazardous to use and whose discharge into the atmosphere is generally to be avoided for environmental reasons. When paints are applied in liquid form adhesion to the underlying surface is not always as good as desired. Further, liquid paints must generally be applied in two steps, since two layers are necessary to obtain sufficient protection.

SUMMARY OF THE INVENTION

It is an objective of the invention to provide a protective layer over the copper-free reflective metal layer of a reflective article in a manner which enables one or more of the above-mentioned disadvantages to be avoided.

We have discovered that this and other useful objectives can be achieved where the protective paint is applied in the form of a powder of specified composition.

Thus, according to the invention there is provided a method of forming a reflective article comprising a copper-free reflective metal layer carried on a transparent substrate, the method comprising the steps of forming a coating comprising a layer of the reflective metal on a surface of the substrate, and application of a paint powder comprising a polymer and the curing of the polymer to form a protective layer of paint over the metal coating.

DESCRIPTION OF THE PREFERRED EMBODIMENTS

The transparent substrate may be a transparent rigid material, such as plastics material, but is preferably a vitreous substrate such as glass. Clear glass is preferred although coloured glass can be used.

Usually the reflective metal comprises silver. While silver alone is preferably used for the reflective metal, the present invention also extends to reflective articles where the reflective metal is another metal such as aluminium. In the following general description, references to silver as the reflective metal should be interpreted as also applying to other reflective metals, except where the context demands otherwise.

Usually the reflective metal article is a mirror, although the invention also extends to other reflective articles which carry a reflective metal. In the following general description, references to mirrors as the reflective article should be interpreted as also applying to other reflective articles, except where the context demands otherwise.

Prior to the application of the reflective layer and the paint powder, the substrate may be contacted with an activating solution comprising ions of at least one of bismuth (III), chromium (II), gold (III), indium (III), nickel (II), palladium (II), platinum (II), rhodium (III), ruthenium (III), titanium (III), vanadium (III) and zinc (II), as described in British Patent Application GB 2289289. Prior to contacting the substrate with the activating solution, the substrate is preferably sensitized with a sensitizing solution, such as $SnCl_2$.

The mirrors to which the invention can be applied may be manufactured by a method which includes the treatment of the silver layer with an acidified aqueous solution of Sn (II) salt as described in British patent application GB 2252568 referred to above.

Alternatively, the mirrors may be manufactured by a method as described in GB 2254339 referred to above.

According to a preferred embodiment of the invention, prior to the application of the paint powder, the method comprises forming a metal coating comprising a reflective layer of silver on a surface of the substrate (which is preferably a clean surface), contacting the metal coating with a treatment solution containing ions of at least one of the group consisting of Al (III), Cr (II), V (II or III), Ti (II or III), Fe (II), In (I or II) and Sn (II). The thus treated metal coating may be washed and dried. It is found that the metal coating of a reflective article according to this embodiment of the invention is afforded an additional measure of protection against corrosion by treatment with the treatment solution. This method of manufacturing such a reflective article can also be very simple and economical to perform.

Thus, the method may include contacting the metal coating with a freshly-made acidified aqueous treatment solution of a stannous salt to augment the population of tin atoms in a surface stratum of the metal coating, such solution being free from opalescence, and washing and drying the thus treated metal coating. It is found that thee silver of an article according to this embodiment of the invention is afforded an additional measure of protection against corrosion by treatment with an acidified aqueous solution of a stannous salt. It is believed that this is due to the incorporation of a population of tin atoms in a surface stratum of the metal of the article. It is advisable to use a fresh solution of a stannous salt.

Solutions of tin (II) salts may be used simply and economically. Contacting the coating with as little as 1 mg/m$^2$ tin in solution is quite sufficient to afford some degree of protection, and it is considered that the application of quantities greater than 1500 mg/m$^2$ affords no commensurate increase in corrosion resistance. Indeed, using greater quantities may have a deleterious effect in decreasing adherence between the reflective coating and the paint powder which is subsequently applied.

The present invention does not extend to mirrors manufactured by a method which includes overcoating a silver layer with a protective layer of copper. We have found that the presence of copper may reduce the adherence of the paint powder to the mirror and it is for this reason that the method according to the invention is particularly applicable to copper-free mirrors.

Preferably silane is applied to the silver layer before the application of the paint powder thereto to improve the adhesion of the paint powder to the silver layer. Contacting the silver coating with a silane before painting can promote adhesion of the paint to the treated metal coating, so promoting resistance of the reflective article to abrasion and corrosion. The silane may be in the form of an aminoalkyl alkoxysilane such as γ-aminopropyl triethoxysilane and may be applied by spraying an aqueous solution thereof, followed by rinsing and drying.

It is necessary that the paint powder comprises a curable polymer and for this purpose we prefer a thermosetting polymer rather than a thermoplastic polymer. The thermosetting polymer should be such as is permanently cured after heating. This allows the cutting up and assembly of the article, for example a mirror, without damage to the paint.

The glass transition temperature of the thermosetting polymer should be sufficiently high to allow application of the powder but the cured paint must be sufficiently flexible to resist forces such as mechanical forces. Preferably, the glass transition temperature (Tg) of the thermosetting polymer is between 60 and 90° C., most preferably between 60 and 75° C. As the thermosetting polymer, epoxy, polyester, polyurethane, acrylic or amino resins such as melamine may be used.

The paint powder is preferably homogeneous, to the extent that each particle thereof contains the same ingredients. In addition to the thermosetting polymer, the paint may contain other ingredients such as fillers (for example a carbonate) and pigments. Any pigment compatible with the thermosetting polymer can be used. The paint powder is however preferably free of volatile compounds and by preference is totally free of lead and lead compounds.

The granulometry of the paint powder is important in order to obtain a uniform cured paint layer. Preferably, the distribution of the sizes of particles is relatively large. If the granulometric range is too narrow, there is a risk of forming a powder coating with a significant number of voids. Such voids may be difficult to fill up during curing of the powder. Furthermore the granulometry of the powder particles is an important factor in the ease with which the powder may be applied by electrostatic projection. Thus, we prefer that the granulometry of the paint powder should be between 0 and 200 μm for example with 90% by volume of the particles being between 10 and 100 μm.

Preferably, the paint powder is applied by projection. A suitable projection method is electrostatic projection. An electric generator provides a continuous high tension of for example 40 to 80 kV which, when applied to the nozzle of a gun, creates a strong electrical field which ionises the air and charges powder particles passing therethrough. The charged particles are directed towards the substrate to be coated, that is the mirror, which is earthed. The paint powder becomes deposited on the substrate and is then ready to be cured. The paint powder is preferably applied at room temperature.

Preferably, the thermosetting polymer is cured by placing the reflective article, together with the paint powder applied thereto, in an oven. A suitable curing temperature is from 150° C. to 180° C. Curing typically takes a few minutes.

Preferably, the protective layer of paint has a thickness of from 50 μm to 80 μm, such as about 60 μm.

One protective paint layer is generally sufficient to protect the reflective metal layer.

The present invention is particularly applicable to mirrors of irregular configuration, such as curved mirrors, where the prior art painting techniques are more difficult to perform.

We have found that it is possible for the corrosion resistance and solvent resistance of the article carrying the paint deposited from a powder according to the invention to be as good or even better than would be the case for similar articles treated with two layers of paint applied from a liquid in the known manner. The mirrors according to the invention may also exhibit good resistance to conventional adhesives.

EXAMPLES 1 TO 3+CONTROL 1

In Example 1 mirrors are manufactured on a conventional mirror production line in which sheets of glass are conveyed along a path by a roller conveyor.

The sheets of glass are first of all polished, rinsed and then sensitised by means of a tin chloride solution, in the usual manner, and then rinsed.

An acidic aqueous solution of $PdCl_2$ is then sprayed onto the sheets of glass. This solution is prepared from a starting solution containing 6 g of $PdCl_2/l$ acidified with HCl in order to obtain a pH of approximately 1, and diluted with demineralised water in order to feed spray nozzles which direct the dilute solution, which contains about 30 mg $PdCl_2/l$, onto the sheets of glass, so as to spray approximately 5.5 mg of $PdCl_2/m^2$ of glass. The contact time of the palladium chloride on the surface of the sensitised glass is approximately 15 seconds.

The sheets of glass thus activated then pass to a rinsing station where demineralised water is sprayed, and then to the silvering station where a traditional silvering solution is sprayed, comprising a silver salt and a reducing agent. The flow rate and concentration of the silvering solution sprayed onto the glass are controlled so as to form, under conventional production conditions, a layer containing approximately 800–850 mg/m² of silver. It is observed that the mass of silver deposited is approximately 900–950 mg/m².

The glass is then rinsed. Directly after the rinsing of the silver coating, a freshly formed acidified solution of tin chloride is sprayed onto the silvered glass sheets moving forward, as described in patent application GB 2252568.

The mirrors are then treated by spraying with a solution containing 0.1% by volume of γ-aminopropyl triethoxysilane (Silane A 1100 from Union Carbide).

For Control 1, a coppering solution of a usual composition is sprayed, after the deposition of silver, onto the silver coating in order to form a coating containing approximately 300 mg/m² of copper. This is achieved by simultaneously spraying a solution A and a solution B. Solution A is prepared by mixing an ammonia solution with a solution containing copper sulphate and hydroxylamine sulphate. Solution B contains citric acid and sulphuric acid. The glass is then rinsed and dried.

The paint which is then used in both Example 1 and Control 1 is a thermosetting powder paint of an epoxy-polyester resin having a Tg of approximately 80° C. (FF112 TRAL7001GL from the firm OXYPLAST) having a grey colour. This paint is applied by electrostatic projection. In this method an electric generator provides a continuous high tension of about 60 kV which, when applied to the nozzle of a gun, creates a strong electrical field which ionises the air and charges powder particles passing therethrough. The charged particles are directed towards the substrate to be coated, that is the mirror, which is earthed. The paint powder becomes deposited on the substrate and is then ready to be cured. The paint powder is applied at room temperature.

The mirror is then placed in an oven at 150 to 180° C., to cure the paint.

The mirrors according to these two examples differ significantly from the point of view of corrosion at the edges.

Examples 2 and 3 are similar to Example 1, except that the thermosetting powder paint was of an epoxy-polyester resin having a Tg of approximately 90° C. (FF160 94315CS, from OXYPLAST) having a beige colour. The mirror according to Example 2 is not treated with silane. It is noticed that the quality of the mirror treated with silane (Example 3) is better then the mirror not treated with silane (Example 2).

Mirrors manufactured in this manner are subjected to various accelerated ageing tests.

One indication of the resistance to ageing of a mirror incorporating a metallic film can be given by subjecting it to a copper-accelerated acetic acid salt spray test known as the CASS Test in which the mirror is placed in a testing chamber at 50° C. and is subjected to the action of a fog formed by spraying an aqueous solution containing 50 g/l sodium chloride, 0.2 g/l anhydrous cuprous chloride with sufficient glacial acetic acid to bring the pH of the sprayed solution to between 3.0 and 3.1. Full details of this test are set out in International Standard ISO 3770-1976. Mirrors may be subjected to the action of the saline fog for different lengths of time, whereafter the reflective properties of the artificially aged mirror may be compared with the reflective properties of the freshly formed mirror. We find that an exposure time of 120 hours gives a useful indication of the resistance of a mirror to ageing. We perform the CASS Test on 10 cm square mirror tiles, and after exposure to the copper-accelerated acetic acid salt spray for 120 hours, each tile is subjected to microscopic examination. The principal visible evidence of corrosion is a darkening of the silver layer and peeling of the paint around the margins of the mirror. The extent of corrosion is noted at five regularly spaced sites on each of two opposed edges of the tile and the mean of these ten measurements is calculated. One can also measure the maximum corrosion present at the margin of the tile to obtain a result which is again measured in micrometers.

A second indication of the resistance to ageing of a mirror incorporating a metallic film can be given by subjecting it to a Salt Fog Test which consists in subjecting the mirror to the action, in a chamber maintained at 35° C., of a salt fog formed by spraying an aqueous solution containing 50 g/l sodium chloride. We find that an exposure time of 480 hours to the Salt Fog Test gives a useful indication of the resistance of a mirror to ageing. The mirror is again subjected to microscopic examination, and the corrosion present at the margin of the tile is measured to obtain a result in micrometers, in the same way as in the CASS Test.

Mirrors measuring 10 cm square manufactured according to Example 1 and Control 1 are subjected to the CASS and salt fog tests. The results are as set out in the following TABLE I:

TABLE I

|  | CASS test average (μm) | Salt fog test average (μm) | Thickness of paint layer (μm) |
| --- | --- | --- | --- |
| Control 1 | 20000 | 16000 | 75 |
| Example 1 | 1733 | 46 | 63 |
| Example 2 |  | paint separated | 60 |
| Example 3 | 772 | 159 | 62 |

The rear face of each mirror is fixed to a sheet of glass with the aid of an adhesive. The assembly is placed in an oven at 100° C. for 24 hours. The reflective face of the mirror is then examined. If the layer of silver has been attacked by the adhesive, an imperfection or fogging in the form of a diffuse reflection.

Two adhesives were used, namely Silirub (a silicone oxime) and Perenator (an alkoxy silicone). The results were as follows:

|  | Silirub | Perenator |
| --- | --- | --- |
| Control 1 | fogging | OK |
| Example 1 | fogging | OK |
| Example 2 | OK | OK |
| Example 3 | OK | OK |

The mirrors were therefore found to exhibit good resistance to the adhesives, especially the mirrors according to Examples 2 and 3. Similar mirrors having paint formed in the classical manner, i.e. from liquid rather than powder form, exhibit a similar resistance to those of Examples 2 and 3.

EXAMPLES 4 TO 9

In these examples the treatment with silane is effected by pouring a solution of silane rather than by spraying. The solution is poured at an amount of 1 liter per m$^2$ of silvered substrate. The solution is left for 30 to 45 seconds and then the mirror is rinsed and dried before projecting the paint.

The paint used in Examples 4 to 9 is a thermosetting powder paint of an epoxy-polyester resin having a Tg of approximately 75° C. (DFF112RAL7001 3C from OXYPLAST). This paint comprises Dolomite (CaMg(CO$_3$)$_2$), barite (BaSO$_4$), calcite (CaCO$_3$) and rutile (TiO$_2$) as fillers and pigments. The treatments are carried out as follows.

EXAMPLE 4

The mirrors are treated with an aqueous solution containing 0.1% by volume of γ-aminopropyl triethoxysilane (Silane A 1100 from Union Carbide).

EXAMPLE 5

No silane treatment.

EXAMPLE 6

The mirrors are treated with an acetic acid solution containing 0.1% by volume of a 20:80 by volume mixture of Silane A 1100 and bis(trimethoxysilylpropyl) amine (Silane A 1170 from Union Carbide).

EXAMPLE 7

The mirrors are treated with an acetic acid solution containing 0.1% by volume of an 80:20 by volume mixture of Silane A 1100 and Silane A 1170.

EXAMPLE 8

The mirrors are treated with a dilute acetic acid solution containing 0.1% by volume of Silane A 1170 at pH=4.5.

EXAMPLE 9

The mirrors are treated with a dilute acetic acid solution containing 0.1% by volume of Silane A 1100 at pH=4.5.

The thickness of each paint coating was about 59 μm.

The results of the two ageing tests on the mirrors of Examples 4 to 9 are as set out in the following TABLE II:

TABLE II

|  | CASS test average (μm) | Salt fog test average (μm) |
| --- | --- | --- |
| Example 4 | 1527 | 81 |
| Example 5 | paint separation | peeling of paint at the edges |
| Example 6 | 1724 | 96 |
| Example 7 | 1513 | 77 |
| Example 8 | 1414 | 58 |
| Example 9 | 1170 | 139 |

What is claimed is:

1. A method of forming a reflective mirror comprised of a copper-free reflective metal layer carried on a transparent substrate, the method comprising the steps of:

providing a substrate which is transparent;

contacting the substrate with an activating solution comprised of ions of at least one of bismuth (III), chromium (II), gold (III), indium (III), nickel (II), palladium (II), platinum (II), rhodium (III), ruthenium (III), titanium (III), vanadium (III) and zinc (II) to provide an activated substrate;

forming a coating comprised of a layer of copper-free reflective metal on a surface of the activated substrate;

applying a paint powder which is comprised of a polymer land which is free of lead and onto the coating to provide a powder coated assembly; and treating the polymer to form a protective layer of paint on the coating.

2. The method according to claim 1 wherein the layer of copper-free reflective metal comprises silver.

3. The method according to claim 1, wherein the polymer is a thermosetting polymer.

4. The method according to claim 3, wherein treating the polymer cures the thermosetting polymer and is accomplished by placing the powder coated assembly in an oven.

5. The method according to claim 3, wherein the thermosetting polymer has a glass transition temperature ranging from 60° to 90° C.

6. The method according to claim 5, wherein the thermosetting polymer has a glass transition temperature ranging from 60° to 75° C.

7. The method according to claim 3, wherein the thermosetting polymer is an epoxy-polyester resin.

8. The method according to claim 3, wherein treating the polymer provides a permanently cured thermosetting polymer so that the reflective mirror may be cut without damage to the protective layer of paint.

9. The method according to claim 1, wherein applying the paint powder onto the coating is accomplished by projection.

10. The method according to claim 9, wherein applying the paint powder onto the coating is accomplished by electrostatic projection.

11. The method according to claim 1, wherein the protective layer of paint has a thickness ranging from 50 μm to 80 μm.

12. The method according to claim 1, wherein the paint powder applied onto the coating is free of volatile organic solvent.

13. The method according to claim 1, wherein the substrate comprises a flat sheet of glass.

14. The method according to claim 1, wherein the mirror is curved.

15. The method according to claim 1, further comprising contacting the substrate with a sensitizing solution prior to contacting the substrate with the activating solution.

16. The method according to claim 1, wherein the reflective metal is silver, and wherein the method further comprises contacting the coating with a treatment solution containing at least one ion selected from the group consisting of ions of Al (III), Cr (II), V (II or III), Ti (II or III), Fe (II), In (I or II), and Sn (II) prior to applying the paint powder.

17. A mirror comprised of a copper-free reflective metal layer carried on a transparent substrate and having a protective layer of paint formed onto the reflective layer from a paint powder according to the method of claim 1.

18. The method according to claim 1, further comprising applying silane to the reflective metal layer prior to applying the paint powder.

19. The method according to claim 18, wherein the silane is an aminoalkyl alkoxysilane and applying is accomplished by spraying an aqueous solution thereof.

20. The method according to claim 19, wherein the aminoalkyl alkoxysilane is an γ-aminopropyl triethoxysilane.

21. The method according to claim 1, wherein the paint powder is comprised of particles having a particle size of not more than 200 μm.

22. The method according to claim 21, wherein the paint powder has a granulometry wherein at least 90% of the particles have a particle size ranging 10 to 100 μm.

23. A reflective mirror comprised of a copper-free reflective metal layer carried on a transparent substrate and having a protective layer of paint formed onto the reflective metal layer from a paint powder according to the method of claim 1.

24. The method according to claim 1, wherein the paint powder is substantially free of lead and lead compounds.

25. The method according to claim 1, wherein the reflective mirror may be cut without damage to the protective layer of paint.

26. The method according to claim 1, wherein treating the polymer to form a protective layer of paint is accomplished by one of heating or curing.

27. A method of forming a reflective mirror comprised of a copper-free reflective metal layer carried on a transparent substrate, the method comprising the steps of:

providing a substrate which is transparent;

forming a coating comprised of a layer of metal which is reflective and which is copper free on a surface of the substrate;

contacting the coating with a treatment solution containing at least one ion selected from the group consisting of ions of Al (III), Cr (II), V (II or III), Ti (II or III), Fe (II), In (I or II), and Sn (II) to provide a treated coating;

applying a paint powder which is comprised of a polymer onto the treated coating to provide a powder coated assembly; and curing the polymer to form a protective layer of paint on the coating.

28. The method according to claim 27, wherein the polymer is a thermosetting polymer.

29. The method according to claim 28, wherein treating the polymer cures the thermosetting polymer and is accomplished by placing the powder coated assembly in an oven.

30. The method according to claim 28, wherein the thermosetting polymer has a glass transition temperature ranging from 60° to 90° C.

31. The method according to claim 30, wherein the thermosetting polymer has a glass transition temperature ranging from 60° to 75° C.

32. The method according to claim 27, wherein applying the paint powder onto the coating is accomplished by projection.

33. The method according to claim 32, wherein applying the paint powder onto the coating is accomplished by electrostatic projection.

34. The method according to claim 27, wherein the protective layer of paint has a thickness ranging from 50 μm to 80 μm.

35. The method according to claim 27, wherein the paint powder applied onto the coating is free of volatile organic solvent.

36. The method according to claim 27, wherein the substrate comprises a flat sheet of glass.

37. The method according to claim 27, wherein the reflective mirror is curved.

38. The method according to claim 27, further comprising contacting the substrate with an activating solution comprised of ions of at least one of bismuth (III), chromium (II), gold (III), indium (III), nickel (II), palladium (II), platinum (II), rhodium (III), ruthenium (III), titanium (III), vanadium (III) and zinc (II) prior to forming the coating thereon.

39. The method according to claim 38, further comprising contacting the substrate with a sensitizing solution prior to contacting the substrate with the activating solution.

40. The method according to claim 27, further comprising applying silane to the reflective metal layer prior to applying the paint powder.

41. The method according to claim 40, wherein the silane is an aminoalkyl alkoxysilane and applying is accomplished by spraying an aqueous solution thereof.

42. The method according to claim 41, wherein the aminoalkyl alkoxysilane is an γ-aminopropyl triethoxysilane.

43. The method according to claim 27, wherein the paint powder is comprised of particles having a particle size of not more than 200 μm.

44. The method according to claim 43, wherein the paint powder has a granulometry wherein at least 90% of the particles have a particle size ranging 10 to 100 μm.

45. A reflective mirror comprised of a copper-free reflective metal layer carried on a transparent substrate and having a protective layer of paint formed onto the reflective metal layer from a paint powder according to the method of claim 27.

46. A mirror comprised of a copper-free reflective silver layer carried on a transparent substrate and having a protective layer of paint formed onto the reflective layer from a paint powder according to the method of claim 27.

47. The method according to claim 27, wherein the paint powder is substantially free of lead and lead compounds.

* * * * *